US012764215B2

(12) United States Patent
Deng

(10) Patent No.: US 12,764,215 B2
(45) Date of Patent: Oct. 13, 2026

(54) AUXILIARY DEVICE AND ELECTRONIC SYSTEM

(71) Applicant: GUANGDONG XIZHONGXI TECHNOLOGY CO., LTD., Dongguan (CN)

(72) Inventor: Xiuhong Deng, Shaoyang (CN)

(73) Assignee: GUANGDONG XIZHONGXI TECHNOLOGY CO., LTD., Dongguan (CN)

( * ) Notice: Subject to any disclaimer, the term of this patent is extended or adjusted under 35 U.S.C. 154(b) by 197 days.

(21) Appl. No.: 18/937,252

(22) Filed: Nov. 5, 2024

(65) Prior Publication Data

US 2025/0385963 A1 Dec. 18, 2025

(30) Foreign Application Priority Data

Jun. 12, 2024 (CN) ........................ 202421343832.9

(51) Int. Cl.
*H04M 1/02* (2006.01)
*H04M 1/04* (2006.01)
*H04M 1/72409* (2021.01)

(52) U.S. Cl.
CPC ....... *H04M 1/0279* (2013.01); *H04M 1/0262* (2013.01); *H04M 1/0277* (2013.01); *H04M 1/04* (2013.01); *H04M 1/724094* (2022.02)

(58) Field of Classification Search
CPC .............. H04M 1/0279; H04M 1/0277; H04N 23/50–51
See application file for complete search history.

(56) References Cited

U.S. PATENT DOCUMENTS

| | | | | |
|---|---|---|---|---|
| 9,197,273 | B2 * | 11/2015 | Haleluk | H04M 1/0202 |
| 9,288,295 | B2 * | 3/2016 | Ivanovski | H04B 1/3888 |
| 9,467,608 | B2 * | 10/2016 | Barros | A45C 13/002 |
| 9,596,393 | B2 * | 3/2017 | Barros | H04N 23/66 |
| 9,729,770 | B2 * | 8/2017 | Barros | H04N 23/64 |
| 9,781,319 | B2 * | 10/2017 | Barros | G03B 17/565 |
| 9,838,581 | B2 * | 12/2017 | Barros | H04N 23/54 |
| 10,003,370 | B2 * | 6/2018 | Fathollahi | H04M 1/185 |
| 10,003,724 | B2 * | 6/2018 | Barros | G02B 7/14 |
| 10,313,568 | B2 * | 6/2019 | Barros | H04N 23/73 |

(Continued)

*Primary Examiner* — Patrick F Marinelli
(74) *Attorney, Agent, or Firm* — HOWARD M COHN and Associates, LLC

(57) ABSTRACT

An auxiliary device and an electronic system are provided. The auxiliary device includes a case body and a control assembly. The case body defines an accommodating cavity, the accommodating cavity defines an opening at one side thereof, and the accommodating cavity is configured to accommodate a mobile terminal. The control assembly is disposed in the accommodating cavity, and the control assembly is communicatively connected to the mobile terminal. The control assembly includes a transceiver module, a processing module, and an operation module, the processing module is respectively electrically connected to the transceiver module and the operation module, the transceiver module is communicatively connected to the mobile terminal, the operation module is configured to send an operation signal to the processing module, the processing module is configured to receive the operation signal and send the operation signal to the mobile terminal through the transceiver module.

9 Claims, 6 Drawing Sheets

(56) References Cited

U.S. PATENT DOCUMENTS

| | | | | |
|---|---|---|---|---|
| 10,348,946 | B2 * | 7/2019 | Barros | H04N 23/65 |
| 10,375,284 | B2 * | 8/2019 | Barros | H04B 1/3888 |
| 10,798,235 | B2 * | 10/2020 | Tsai | G06F 1/1632 |
| 11,102,341 | B1 * | 8/2021 | Kutsko | H04B 1/3888 |
| 12,321,088 | B2 * | 6/2025 | Henning | G03B 17/563 |
| 12,504,829 | B2 * | 12/2025 | Hoover | G06F 3/02 |
| 2012/0282977 | A1 * | 11/2012 | Haleluk | H04B 1/3888 455/556.1 |
| 2015/0072730 | A1 * | 3/2015 | Haleluk | H04M 1/724092 455/556.1 |
| 2015/0133204 | A1 * | 5/2015 | Ivanovski | H04B 1/3888 455/575.8 |
| 2016/0216477 | A1 * | 7/2016 | Barros | H04M 1/0264 |
| 2016/0219194 | A1 * | 7/2016 | Barros | H04N 23/51 |
| 2016/0219197 | A1 * | 7/2016 | Barros | G02B 13/001 |
| 2016/0219202 | A1 * | 7/2016 | Barros | H04B 1/3888 |
| 2017/0099419 | A1 * | 4/2017 | Barros | G03B 17/566 |
| 2017/0223242 | A1 * | 8/2017 | Barros | H04N 23/632 |
| 2017/0245118 | A1 * | 8/2017 | Hong | H04W 4/06 |
| 2018/0027156 | A1 * | 1/2018 | Barros | G02B 13/001 348/207.11 |
| 2018/0338076 | A1 * | 11/2018 | Barros | A45C 13/002 |
| 2019/0104238 | A1 * | 4/2019 | Barros | H04N 23/64 |
| 2024/0393888 | A1 * | 11/2024 | Hoover | G06F 3/02 |
| 2025/0385963 | A1 * | 12/2025 | Deng | H04M 1/0279 |

* cited by examiner

AUXILIARY DEVICE AND ELECTRONIC SYSTEM

TECHNICAL FIELD

The present disclosure relates to a technical field of terminal devices, and in particular to an auxiliary device and an electronic system.

BACKGROUND

With the iteration of electronic products, new terminal devices of some brands are provided with dedicated photography buttons that allow users to adjust photography settings, such as focusing, photo taking, video recording, etc. However, older terminal devices have no such convenient functions. Therefore, an auxiliary device and an electronic system are provided.

SUMMARY

Based on above, it is necessary to provide an auxiliary device and an electronic system aiming at a problem in the prior art that some of terminal devices has no functions of adjusting photography settings by control buttons.

In order to achieve above aims, the present disclosure provide technical solutions as follows.

In a first aspect, embodiments of the present disclosure provides the auxiliary device, including a case body and a control assembly. The case body defines an accommodating cavity, the accommodating cavity defines an opening at one side thereof, and the accommodating cavity is configured to accommodate a mobile terminal. The control assembly is disposed in the accommodating cavity, and the control assembly is communicatively connected to the mobile terminal.

The control assembly includes a transceiver module, a processing module, and an operation module, the processing module is respectively electrically connected to the transceiver module and the operation module, the transceiver module is communicatively connected to the mobile terminal, the operation module is configured to send an operation signal to the processing module, the processing module is configured to receive the operation signal and send the operation signal to the mobile terminal through the transceiver module.

In one embodiment, the transceiver module includes a wireless communication chip, the wireless communication chip is electrically connected to the processing module and is communicatively connected to the mobile terminal.

In one embodiment, the processing module includes a flexible circuit board and/or a rigid circuit board, the flexible circuit board and/or the rigid circuit board are respectively electrically connected to transceiver module and the operation module.

In one embodiment, the operation module includes a button portion, a through hole is defined on a first edge side of the case body, and the button portion is disposed in the through hole and is exposed to an exterior of the case body.

In one embodiment, the button portion includes a first button area, a second button area, and a third button area. The first button area and the third button area are respectively disposed at two opposite ends of the second button area.

In one embodiment, the control assembly further includes a starting module, the starting module includes a starting button, and the starting button is electrically connected to the processing module.

The control assembly includes an indication module, the indication module includes a signal lamp, and the signal lamp is electrically connected to the processing module.

In one embodiment, the control assembly further includes a power supply module, the power supply module includes a battery, and the battery is electrically connected to the processing module.

In one embodiment, a charging position is disposed on a second edge side of the case body, the control assembly further includes a power supply module and a charging connector configured with a charging cable. The power supply module includes a lithium battery, a positive charging contact, a negative charging contact, a first alignment magnetic attraction component, and a second alignment magnetic attraction component. The lithium battery is disposed in the accommodating cavity, and the positive charging contact, the negative charging contact, the first alignment magnetic attraction component, and the second alignment magnetic attraction component are disposed at the charging position and are exposed to the exterior of the case body. The charging connector includes a positive charging elastic pin, a negative charging elastic pin, a third alignment magnetic attraction component, and a fourth alignment magnetic attraction component. The positive charging elastic pin is matched with the positive charging contact, the negative charging elastic pin is matched with the negative charging contact, the third alignment magnetic attraction component is matched with the first alignment magnetic attraction component, and the fourth alignment magnetic attraction component is matched with the second alignment magnetic attraction component.

The transceiver module further includes a wireless communication mainboard, the wireless communication mainboard is disposed at a bottom of the accommodating cavity, the operation module further includes a button mainboard, the button mainboard is matched with the button portion, the button mainboard is disposed on an inner side wall of the accommodating cavity and is disposed at the through hole.

In one embodiment, the case body includes a first partition layer and a second partition layer, a mounting groove is defined between the first partition layer and the second partition layer, both the transceiver module and the processing module are disposed in the mounting groove.

In a second aspect, the embodiments of the present disclosure provide the electronic system, including the auxiliary device and the mobile terminal as foregoing. a peripheral side of the mobile terminal is wrapped by the auxiliary device, and the mobile terminal is communicatively connected to the auxiliary device.

Compared with the prior art, beneficial effects of the present disclosure are as follows.

The auxiliary device and the electronic system provided by the present disclosure are provided for increasing operation functions of the mobile terminal. Specifically, the auxiliary device includes the case body and the control assembly, the case body defines the accommodating cavity for mounting the control assembly, the control assembly sequentially includes the transceiver module, the processing module, and the operation module, the processing module is respectively electrically connected to the transceiver module and the operation module, and the transceiver module is communicatively connected to the terminal device. In this way, during use of the auxiliary device, the mobile terminal is accommodated in the case body, after the mobile terminal is communicatively connected to the transceiver module, the user may control the mobile terminal to perform corresponding functions by sending the operation signal to the processing module through pressing the operation module, the control module is provided for receiving the operation signal and sending the operation signal to the mobile terminal through the transceiver module, thereby increasing operation functions of the mobile terminal and further improving user experience.

BRIEF DESCRIPTION OF DRAWINGS

In order to more clearly illustrate embodiments of the present disclosure or technical solutions in the prior art, accompanying drawings required in description of the embodiments or the prior art are briefly described below, and obviously, the accompanying drawings in the following description are merely some embodiments of the present disclosure, and for those who skilled in the art, other drawings may be obtained according to structures shown in these drawings without creative efforts.

Figure 1:
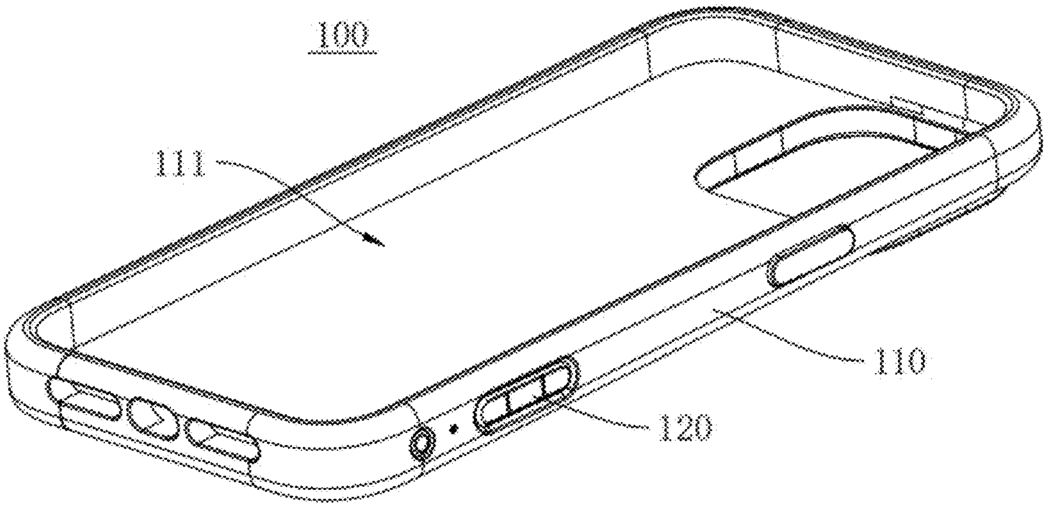
FIG. 1 is a structural schematic diagram of an auxiliary device according to one embodiment of the present disclosure.

Reference numerals in the drawings: 100. auxiliary device; 110. case body; 111. accommodating cavity; 112. first partition layer; 113. second partition layer; 114. through hole; 115. mounting groove; 120. control assembly; 121. transceiver module; 122. processing module; 123. operation module; 1231. button portion; 12311. first button area; 12312. second button area; 12313. third button area; 124. starting module; 1241. starting button; 125. indication module; 1251. signal lamp; 126. power supply module; 1261. battery; 116. charging position; 1211. wireless communication mainboard; 1262. lithium battery; 1263. charging connector; 12631. charging cable; 1263*a*. positive charging elastic pin; 1263*b*. negative charging elastic pin; 1263*c*. third alignment magnetic attraction component; 1263*d*. fourth alignment magnetic attraction component; 126*a*. positive charging contact; 126*b*. negative charging contact; 126*c*. first alignment magnetic attraction component; 126*d*. second alignment magnetic attraction component; 1232. button mainboard; 200. mobile terminal.

DETAILED DESCRIPTION OF EMBODIMENTS

In order to make above aims, features and advantages of the present disclosure more obvious and understandable, specific embodiments of the present disclosure are described in detail below with reference to accompanying drawings.

In the prior art, some of electronic products are provided with corresponding photograph buttons at edge sides thereof and achieve operations, including focusing, photo taking, and video recording, etc., through the corresponding photograph buttons, so as to provide a variety user experience for users.

Based on above, embodiments of the present disclosure provide an auxiliary device 100 for increasing operation functions of a mobile terminal 200, in this way, electronic devices that do not have the photography buttons are enabled to provide photography experience for the users by additionally proving control buttons.

Figure 5:
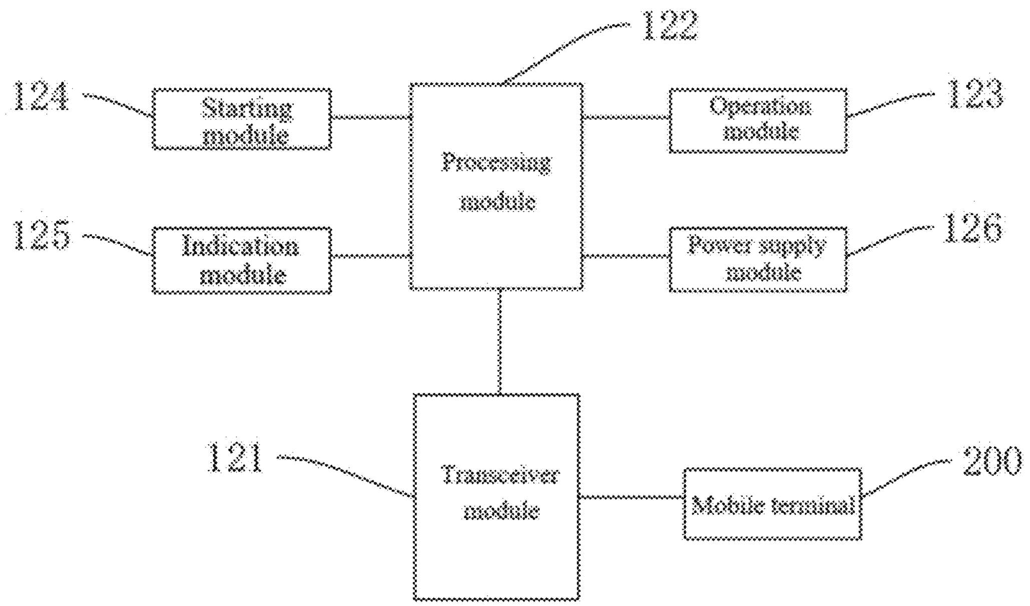
FIG. 5 is a block schematic diagram of the auxiliary device according to one embodiments of the present disclosure.

Referring to FIGS. 1 and 5, the auxiliary device 100 includes a case body 110 and a control assembly 120. The case body 110 defines an accommodating cavity 111, the accommodating cavity 111 defines an opening at one side thereof, and the accommodating cavity 111 is configured to accommodate a mobile terminal 200. The control assembly 120 is disposed in the accommodating cavity 111, and the control assembly 120 is communicatively connected to the mobile terminal 200.

Further referring to FIG. 5, the control assembly 120 includes a transceiver module 121, a processing module 122, and an operation module 123, the processing module 122 is respectively electrically connected to the transceiver module 121 and the operation module 123, the transceiver module 121 is communicatively connected to the mobile terminal 200, the operation module 123 is configured to send an operation signal to the processing module 122, the processing module 122 is configured to receive the operation signal and send the operation signal to the mobile terminal 200 through the transceiver module 121.

For example, the case body 110 is made of a plastic material to provide certain buffer protection for the mobile terminal 200 after wrapping outer sides of the mobile terminal 200.

The control assembly 120 is configured to receive user operation information, and send a corresponding operation instruction to the mobile terminal 200 to implement a photography function. In some embodiments, the transceiver module 121 is a wired connector or a wireless connector, the processing module 122 includes a printed circuit board having a processing chip, the operation module 123 includes an operation button and a related sensor, and the operation module 123 is configured to transmit a related operation signal to the processing chip.

When the mobile terminal 200 is connected to the control assembly 120 through wires, the transceiver module 121 includes a communication wire and a communication connector, when the transceiver module 121 is connected to the mobile terminal 200, the communication connector is inserted and matched with a corresponding jack of the mobile terminal 200; when the mobile terminal is wirelessly connected to the control assembly 120, the transceiver module 121 includes a connecting chip disposed on a circuit board of the transceiver module 121.

It may be understood that the mobile terminal 200 is a terminal device, such as a mobile phone, a tablet, and a laptop, and the case body 110 is reasonably shaped according to different appearances of the mobile terminal 200. For ease of understanding, the mobile terminal 200 in the embodiments of the present disclosure is illustrated by using a smartphone.

In some embodiments, the transceiver module 121 includes a wireless communication chip, the wireless communication chip is electrically connected to the processing module 122 and is communicatively connected to the mobile terminal 200.

For example, the wireless communication chip is installed on a circuit board of the processing module 122, and when there is a short-range wireless connection, a wireless connection method is adopted, such as Bluetooth technology. The Bluetooth technology is capable of establishing the short-range wireless connection for a fixed device and a mobile device based on a low-cost short-range wireless connection.

It may be understood that the wireless connection method is not limited to the Bluetooth technology. In some other embodiments, the transceiver module 121 is selected from a wireless fidelity (Wi-Fi) connector, a wireless local area network (WLAN) connector, etc.

Figure 3:
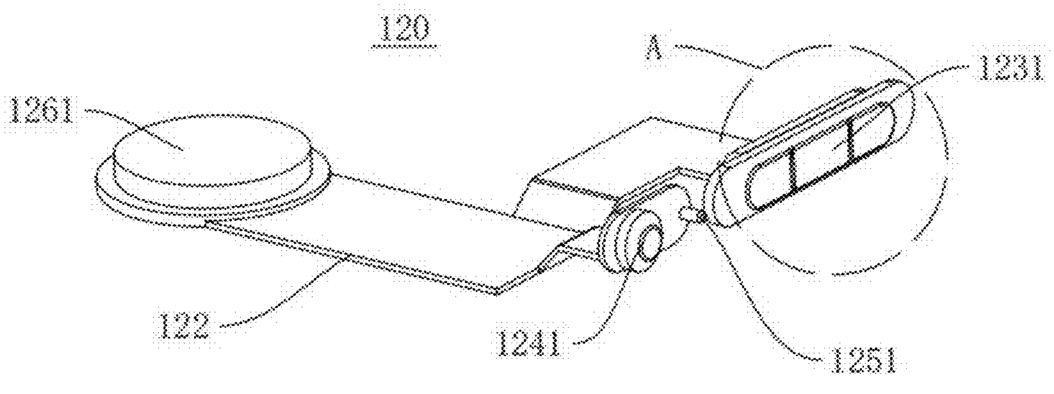
FIG. 3 is structural schematic diagram of a control assembly according to one embodiment of the present disclosure.

Referring to FIG. 3, in some embodiments, the processing module 122 includes a flexible circuit board and/or a rigid circuit board, the flexible circuit board and/or the rigid circuit board are respectively electrically connected to transceiver module 121 and the operation module 123.

For example, the processing module 122 includes only the flexible circuit board or includes only the rigid circuit board, or include both the flexible circuit board and the rigid circuit board at the same time.

In the embodiment, the processing module 122 is a flexible-rigid composite board including the flexible circuit board and the rigid circuit board, the flexible circuit board and the rigid circuit board are combined through processes, such as lamination, to form a circuit board having characteristics of both the flexible circuit board and the rigid circuit board. The flexible-rigid composite board has certain flexible area, and also has a rigid area, so that an internal space of a corresponding product is saved, a volume of the corresponding product is reduced, and product performance is further improved.

Figure 2:
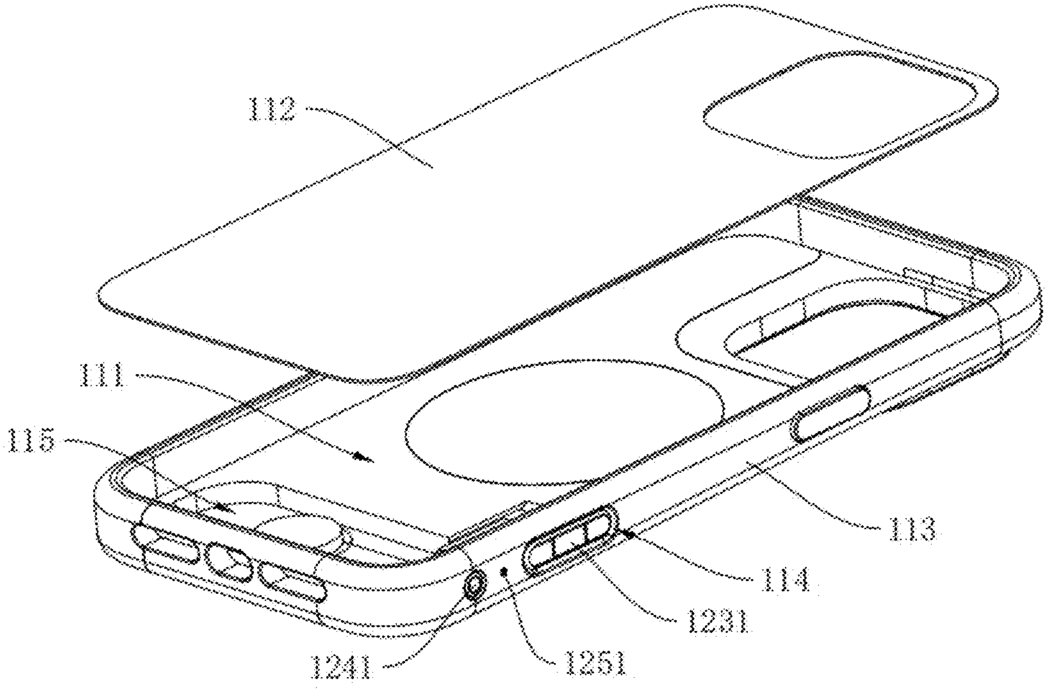
FIG. 2 is an exploded schematic diagram of a case body according to one embodiment of the present disclosure.

Referring FIGS. 2-3, in some embodiments, the operation module 123 includes a button portion 1231, a through hole 114 is defined on a first edge side of the case body 110, and the button portion 1231 is disposed in the through hole 114 and is exposed to an exterior of the case body 110.

For example, the button portion 1231 is disposed in the through hole 114 and is connected to the circuit board of the processing module 122 through a metal plate and a flexible cable. A mechanical button key function of the auxiliary device 100 is achieved through pressing the button portion 1231 by the users to drive the button portion 1231 to move toward an inner side of the through hole 114 and elastically reset. The button portion 1231 is electrically connected to a circuit board of the control assembly 120 to transmit different operation signals to the control assembly 120.

Figure 4:
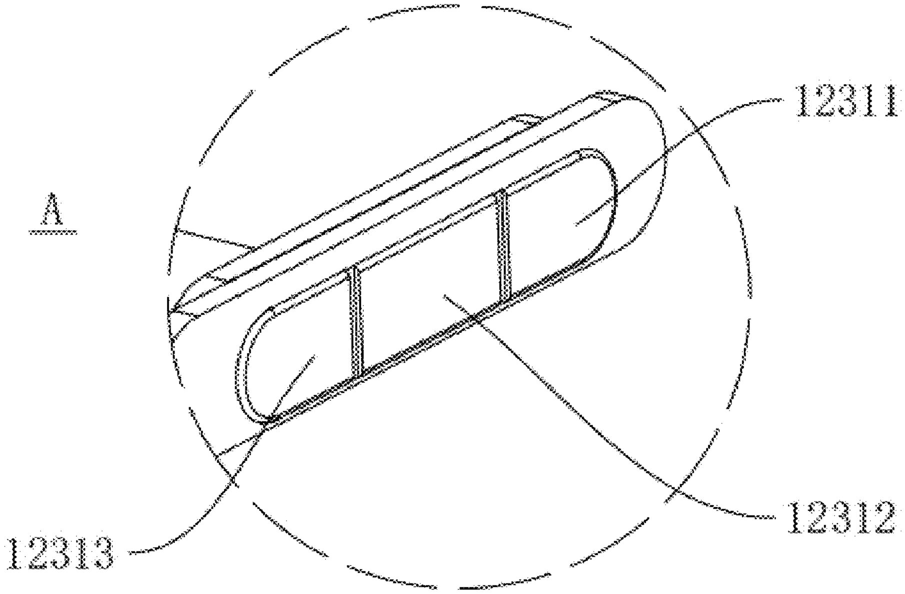
FIG. 4 is an enlarged schematic diagram of portion A shown in FIG. 3.

In some other embodiments, the button portion 1231 adopts capacitive sensing technology or pressure sensing technology to implement touch control, by detecting changes in electric field or resistance caused by electrical charge of human bodies, the control assembly 120 obtain such signal changes through a sensor and perform corresponding adjustment work Referring to FIGS. 3-4, in some embodiment, the button portion 1231 includes a first button area 12311, a second button area 12312, and a third button area 12313. The first button area 12311 and the third button area 12313 are respectively disposed at two opposite ends of the second button area 12312.

For example, the first button area 12311 is a plus button, the second button area 12312 is a shutter button, and the third button area 12313 is a minus button. After the mobile terminal 200 is communicatively connected to the auxiliary device 100, a light tap on the second button area 12312 quickly drives the mobile terminal 200 to enter a photography interface on the mobile terminal 200 for rapid photo capture. For achieving the photo taking and the video recording functions, a single click on the second button area 12312 drives the mobile terminal 200 to take a photo, a double click on the second button area 12312 drive the mobile terminal 200 to switch between a front camera and a rear camera, a triple click on the second button area 12312 drives the mobile terminal 200 to switch to a video recording mode, a long press on the first button area 12311 drives the mobile terminal 200 to zoom in, and a long press on the third button area 12313 drives the mobile terminal to zoom out.

Referring to FIGS. 3 and 5, in some embodiments, the control assembly 120 further includes a starting module 124, the starting module 124 includes a starting button 1241, and the starting button 1241 is electrically connected to the processing module 122

For example, the control assembly 120 maintains an off state in a non-working state to reduce energy loss. When the auxiliary terminal 100 is used in cooperation with the mobile terminal 200, the control assembly 120 is turned on by pressing the starting button 1241 for three seconds, and then a Bluetooth interface of the mobile terminal 200 is opened to perform pairing connection to enable subsequent button functions. Correspondingly, after the control assembly 120 is turned on, long pressing the starting button 1241 again may turn off the control assembly 120, and if there is no Bluetooth connection pairing for a long time, and the control assembly 120 may automatically turn off.

Referring to FIGS. 3 and 5, in some embodiments, the control assembly 120 includes an indication module 125, the indication module 125 includes a signal lamp 1251, and the signal lamp 1251 is electrically connected to the processing module 122.

For example, the signal lamp 1251 is configured to provide feedback on different working states of the control assembly 120, such as flashing green when the control assembly 120 is turned on, flashing during a Bluetooth pairing process, and automatically turning off after a successful pairing; additionally, pressing the first button area 12311 and the third button area 12313 at the same time may switch a focusing mode, and the signal lamp 1251 synchronously switches between green light and red light.

Referring to FIGS. 3 and 5, in some embodiments, the control assembly 120 further includes a power supply module 126, the power supply module 126 includes a battery 1261, and the battery 1261 is electrically connected to the processing module 122.

For example, the battery 1261 is configured to provide power supply for the control assembly 120 for meeting normal operation of each electrical element. In some other embodiments, the battery 1261 is a rechargeable battery 1261, and a charging port is correspondingly defined on the case body for continuous use of the battery 1261.

For example, a charging position 116 is disposed on a second edge side of the case body 110, the control assembly 120 further includes a power supply module 126 and a charging connector 1263 configured with a charging wire 12631. The power supply module 126 includes a lithium battery 1262, a positive charging contact **126*a*, a negative charging contact 126*b*, a first alignment magnetic attraction component 126*c*, and a second alignment magnetic attraction component 126*d*. The lithium battery 1262 is disposed in the accommodating cavity 111, and the positive charging contact 126*a*, the negative charging contact 126*b*, the first alignment magnetic attraction component 126***c*, and the second alignment magnetic attraction component 126*d* are disposed at the charging position 116 and are exposed to the exterior of the case body 110. The charging connector 1263 includes a positive charging elastic pin 1263*a*, a negative charging elastic pin 1263*b*, a third alignment magnetic attraction component 1263*c*, and a fourth alignment magnetic attraction component 1263*d*. The positive charging elastic pin 1263*a* is matched with the positive charging contact 126*a*, the negative charging elastic pin 1263*b* is matched with the negative charging contact 126*b*, the third alignment magnetic attraction component 1263*c* is matched with the first alignment magnetic attraction component 126*c*, and the fourth alignment magnetic attraction component 1263*d* is matched with the second alignment magnetic attraction component 126*d*.

The transceiver module 121 further includes a wireless communication mainboard 1211, the wireless communication mainboard 1211 is disposed at a bottom of the accommodating cavity 111, the operation module 123 further includes a button mainboard 1232, the button mainboard 1232 is matched with the button portion 1231, and the button mainboard 1232 is disposed on an inner side wall of the accommodating cavity 111 and is disposed at the through hole 114.

Figure 8:
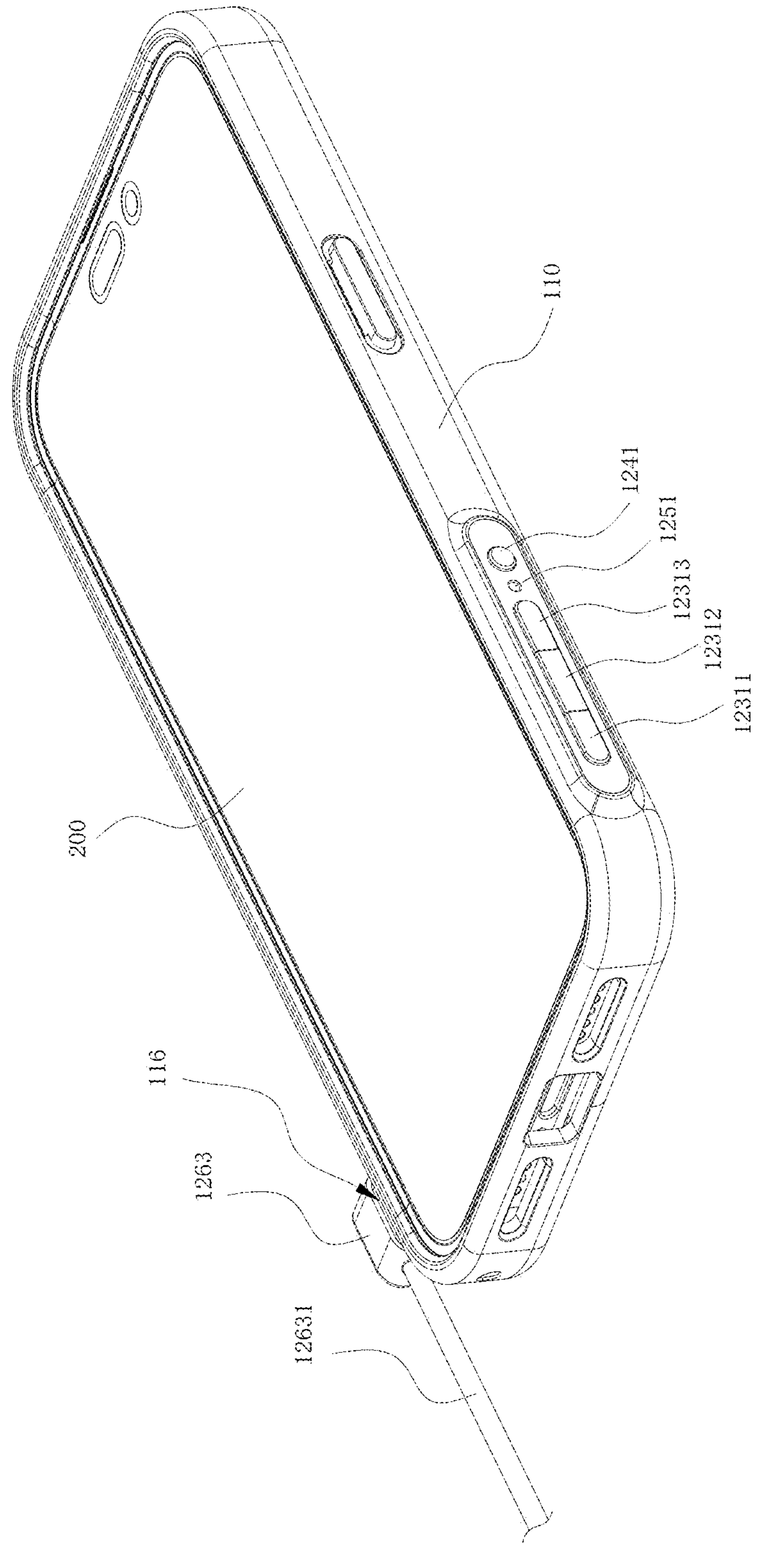
FIG. 8 is another structural schematic diagram of FIG. 6.

Referring to FIG. 8, long pressing the starting button 1241 for three seconds turns on the auxiliary device 100. After the auxiliary device 100 is powered on, the signal lamp 1251, specifically the Bluetooth lamp, flashes. Once pairing connection between the auxiliary device 100 and the mobile terminal 200, specifically the smartphone, is successful, the signal lamp 1251 may stop flashing. After a successful paring, when the smartphone is in a sleep mode and an important moment needs to be captured, a single click on the starting button 1241 drives the smartphone to quickly enter a photography interface, and then a continuous click on the second button area 12412 drives the smartphone to take the photo, and a re-click enable a next photo taking, which is similar to a digital single-lens reflex (DSLR) camera. Long pressing the first button area 12311 or the third button area 12313 may quickly drives the smartphone to zoom in or zoom out. Therefore, photography effects desired by the users are better achieved.

Figure 9:
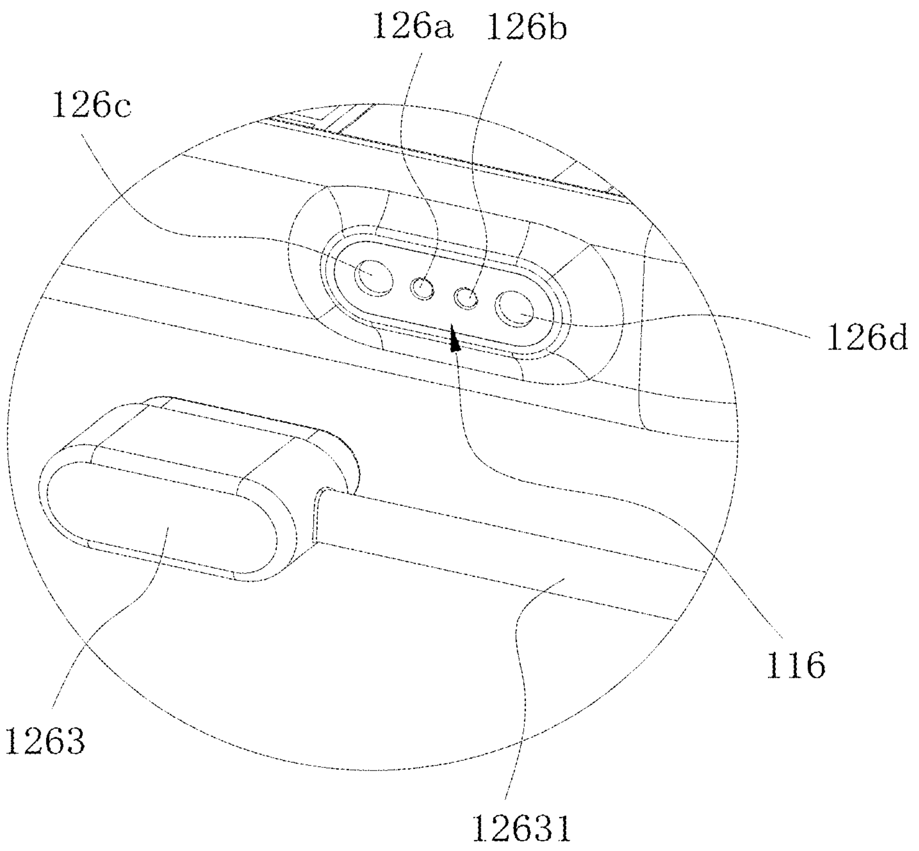
FIG. 9 is an enlarged schematic diagram of portion M shown in FIG. 7.
Figure 10:
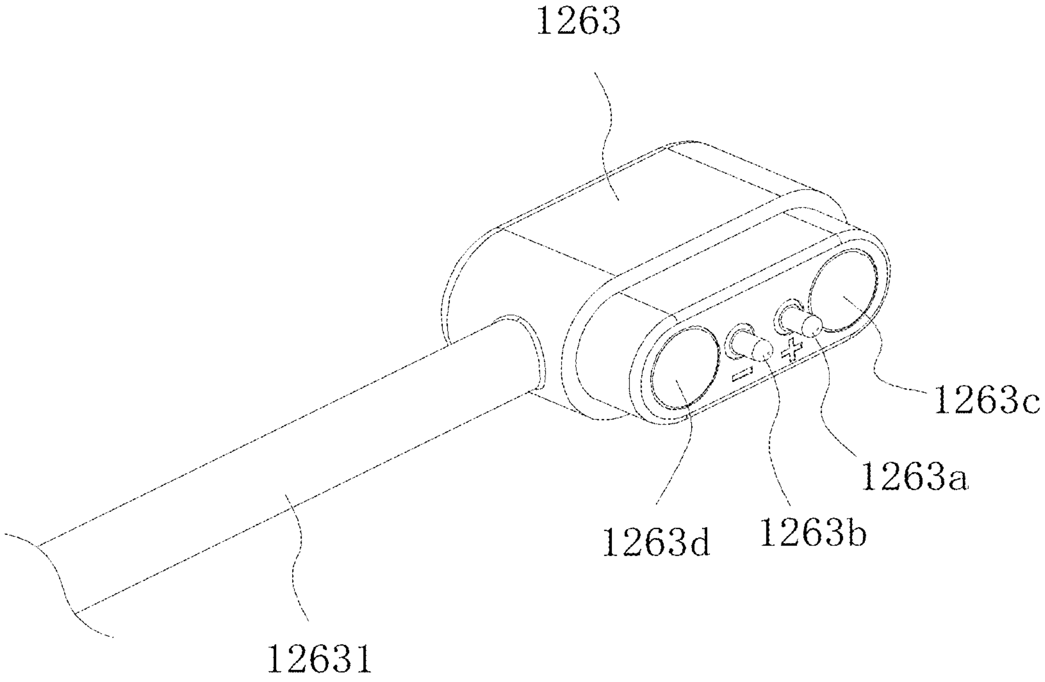
FIG. 10 is a structural schematic diagram of a charging connector with a charging cable according to one embodiment of the present disclosure.

Referring to FIGS. 9 and 10, the charging connector 1263 is configured with the charging cable 12631 for connecting to a power supply. The first alignment magnetic attraction component 126*c* is attracted to the third alignment magnetic attraction component 1263*c*, the second alignment magnetic attraction component 126*d* is attracted to the fourth alignment magnetic attraction component 1263*d*, the positive charging elastic pin 1263*a* is in contact with the positive charging contact 126*a*, and the negative charging elastic pin 1263*b* is in contact with the negative charging contact 126*b* for achieving portable charging.

Figure 6:
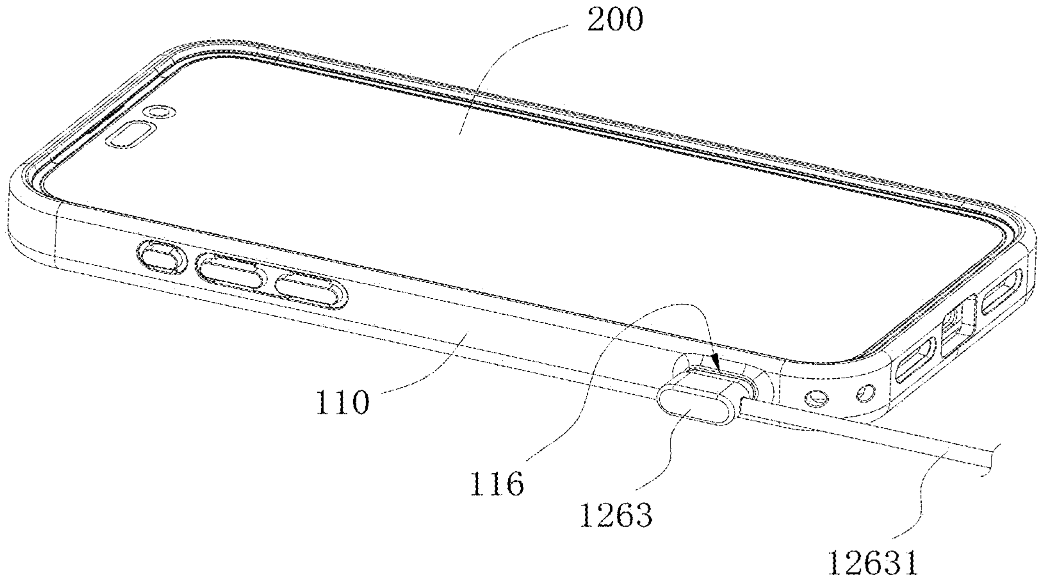
FIG. 6 is a structural schematic diagram of a mobile terminal accommodating in the auxiliary device according to one embodiment of the present disclosure.
Figure 7:
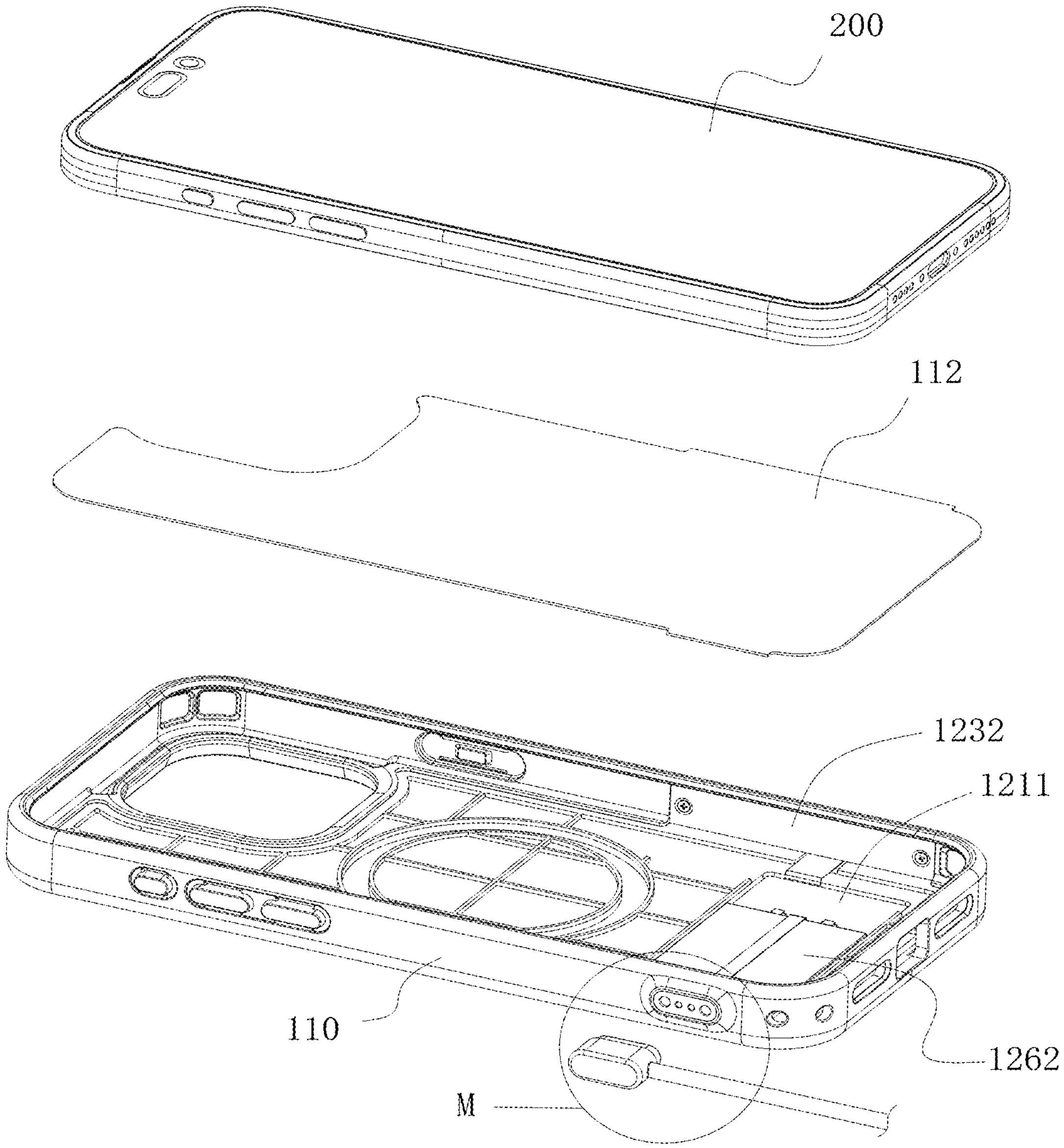
FIG. 7 is an exploded schematic diagram of FIG. 6.

Referring to FIGS. 6-7, the wireless communication mainboard 1211, the button mainboard 1232, the lithium battery 1262, the positive charging contact 126*a*, the negative charging contact 126*b*, the first alignment magnetic attraction component 126*c* and the second alignment magnetic attraction component 126*d* form an integral circuit module to assemble into a hard rubber of the case body 110, then a first partition layer, specifically a cover plate, is attached to a surface of the case body 110, side walls of the case body 110 are made of thermoplastic polyurethane (TPU) and are overmolded onto a hard plastic base of the case body 110. The TPU is convenient for mounting or removing the smartphone, improves contact feeling of the button portion 1231, and further prevents the smartphone from being damaged in case of accidental drops.

Referring FIG. 2, in some embodiments, the case body 110 includes a first partition layer 112 and a second partition layer 113, a mounting groove 115 is defined between the first partition layer 112 and the second partition layer 113, both the transceiver module 121 and the processing module 122 are disposed in the mounting groove 115.

For example, the mounting groove 115 is defined on one side of the first partition layer 112 close to the second partition layer 113, or the second partition layer 113 is close to a side of the first partition layer 112. In this way, each electrical element of the control assembly 120 is capable of being checked and replaced by opening the first partition layer 112, thereby facilitating mounting and maintenance of the control assembly 120.

The embodiments of the present disclosure further provides an electronic system, including the auxiliary device 100 and the mobile terminal 200 as foregoing, a peripheral side of the mobile terminal 200 is wrapped by the auxiliary device 100, and the mobile terminal 200 is communicatively connected to the auxiliary device 100.

The auxiliary device 100 is specifically described as foregoing, and therefore, the auxiliary device 100 of the electronic system has all beneficial effects of the auxiliary device 100 in any one of the foregoing embodiments, and details are not described herein one by one.

The foregoing embodiments only express several implementations of the present disclosure, and description thereof is relatively specific and detailed, but cannot be understood as a limitation on ta patent scope of the present disclosure. It should be noted that, for those who skilled in the art, several modifications and improvements may be made without departing from a concept of the present disclosure, which all fall within a protection scope of the present disclosure. Therefore, the protection scope of the present disclosure shall be subject to the appended claims.

What is claimed is:

1. An auxiliary device, comprising:

a case body; and a control assembly;

wherein the case body defines an accommodating cavity, the accommodating cavity defines an opening at one side thereof, and the accommodating cavity is configured to accommodate a mobile terminal;

the control assembly is disposed in the accommodating cavity, and the control assembly is communicatively connected to the mobile terminal; and the control assembly comprises a transceiver module, a processing module, and an operation module, the processing module is respectively electrically connected to the transceiver module and the operation module, the transceiver module is communicatively connected to the mobile terminal, the operation module is configured to send an operation signal to the processing module, the processing module is configured to receive the operation signal and send the operation signal to the mobile terminal through the transceiver module, wherein the operation module comprises a button portion, a through hole is defined on a first edge side of the case body, and the button portion is disposed in the through hole and is exposed to an exterior of the case body, wherein the control assembly further comprises a starting module, the starting module comprises a starting button, and the starting button is electrically connected to the processing module;

the control assembly comprises an indication module, the indication module comprises a signal lamp, and the signal lamp is electrically connected to the processing module and provides feedback on different working states of the control assembly.

2. The auxiliary device according to claim 1, wherein the transceiver module comprises a wireless communication chip, the wireless communication chip is electrically connected to the processing module and is communicatively connected to the mobile terminal.

3. The auxiliary device according to claim 1, wherein the processing module comprises a flexible circuit board and/or a rigid circuit board, the flexible circuit board and/or the rigid circuit board are respectively electrically connected to transceiver module and the operation module.

4. The auxiliary device according to claim 1, wherein the button portion comprises a first button area, a second button area, and a third button area; and the first button area and the third button area are respectively disposed at two opposite ends of the second button area.

5. The auxiliary device according to claim 1, wherein the control assembly further comprises a power supply module, the power supply module comprises a battery, and the battery is electrically connected to the processing module.

6. The auxiliary device according to claim 1, wherein a charging position is disposed on a second edge side of the case body, the control assembly further comprises a power supply module and a charging connector configured with a charging cable;

the power supply module comprises a lithium battery, a positive charging contact, a negative charging contact, a first alignment magnetic attraction component, and a second alignment magnetic attraction component;

the lithium battery is disposed in the accommodating cavity, and the positive charging contact, the negative charging contact, the first alignment magnetic attraction component, and the second alignment magnetic attraction component are disposed at the charging position and are exposed to the exterior of the case body;

the charging connector comprises a positive charging elastic pin, a negative charging elastic pin, a third alignment magnetic attraction component, and a fourth alignment magnetic attraction component;

the positive charging elastic pin is matched with the positive charging contact, the negative charging elastic pin is matched with the negative charging contact, the third alignment magnetic attraction component is matched with the first alignment magnetic attraction component, and the fourth alignment magnetic attraction component is matched with the second alignment magnetic attraction component; and the transceiver module further comprises a wireless communication mainboard, the wireless communication mainboard is disposed at a bottom of the accommodating cavity, the operation module further comprises a button mainboard, the button mainboard is matched with the button portion, the button mainboard is disposed on an inner side wall of the accommodating cavity and is disposed at the through hole.

7. The auxiliary device according to claim 1, wherein the case body comprises a first partition layer and a second partition layer, a mounting groove is defined between the first partition layer and the second partition layer, both the transceiver module and the processing module are disposed in the mounting groove.

8. An electronic system, comprising: the auxiliary device according to claim 1; and the mobile terminal; wherein a peripheral side of the mobile terminal is wrapped by the auxiliary device, and the mobile terminal is communicatively connected to the auxiliary device.

9. An auxiliary device, comprising:

a case body; and a control assembly;

wherein the case body defines an accommodating cavity, the accommodating cavity defines an opening at one side thereof, and the accommodating cavity is configured to accommodate a mobile terminal;

the control assembly is disposed in the accommodating cavity, and the control assembly is communicatively connected to the mobile terminal; and the control assembly comprises a transceiver module, a processing module, and an operation module, the processing module is respectively electrically connected to the transceiver module and the operation module, the transceiver module is communicatively connected to the mobile terminal, the operation module is configured to send an operation signal to the processing module, the processing module is configured to receive the operation signal and send the operation signal to the mobile terminal through the transceiver module, wherein the operation module comprises a button portion, a through hole is defined on a first edge side of the case body, and the button portion is disposed in the through hole and is exposed to an exterior of the case body, wherein a charging position is disposed on a second edge side of the case body, the control assembly further comprises a power supply module and a charging connector configured with a charging cable;

the power supply module comprises a lithium battery, a positive charging contact, a negative charging contact, a first alignment magnetic attraction component, and a second alignment magnetic attraction component;

the lithium battery is disposed in the accommodating cavity, and the positive charging contact, the negative charging contact, the first alignment magnetic attraction component, and the second alignment magnetic attraction component are disposed at the charging position and are exposed to the exterior of the case body;

the charging connector comprises a positive charging elastic pin, a negative charging elastic pin, a third alignment magnetic attraction component, and a fourth alignment magnetic attraction component;

the positive charging elastic pin is matched with the positive charging contact, the negative charging elastic pin is matched with the negative charging contact, the third alignment magnetic attraction component is matched with the first alignment magnetic attraction component, and the fourth alignment magnetic attraction component is matched with the second alignment magnetic attraction component; and the transceiver module further comprises a wireless communication mainboard, the wireless communication mainboard is disposed at a bottom of the accommodating cavity, the operation module further comprises a button mainboard, the button mainboard is matched with the button portion, the button mainboard is disposed on an inner side wall of the accommodating cavity and is disposed at the through hole.

* * * * *